United States Patent [19]
Scott et al.

[11] Patent Number: 6,095,726
[45] Date of Patent: *Aug. 1, 2000

[54] COPING APPARATUS

[75] Inventors: Martin Scott, Brewster, Mass.; William C. Shaw, Ridgefield, Conn.

[73] Assignee: Shaw Millwork Inc., Ridgefield, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/007,677

[22] Filed: Jan. 15, 1998

[51] Int. Cl.[7] ...................................................... B23C 1/16
[52] U.S. Cl. .......................... 409/92; 83/565; 144/144.1; 409/124; 409/130
[58] Field of Search ................. 83/565; 144/144.1, 144/372; 409/92, 124, 130, 126, 125; 451/237, 281

[56] References Cited

U.S. PATENT DOCUMENTS

| | | |
|---|---|---|
| 765,268 | 7/1904 | Bishop . |
| 1,952,334 | 3/1934 | Robinson . |
| 2,599,893 | 6/1952 | Butler ........................................... 143/6 |
| 2,735,456 | 2/1956 | Grier et al. ................................... 143/6 |
| 3,062,996 | 11/1962 | Ertell et al. . |
| 3,211,061 | 10/1965 | Cretsinger . |
| 3,442,309 | 5/1969 | Jentsch . |
| 3,538,967 | 11/1970 | Hensley ................................... 144/318 |
| 3,730,038 | 5/1973 | Farb ........................................... 83/837 |
| 3,751,856 | 8/1973 | Jorgensen .............................. 51/100 R |
| 3,865,162 | 2/1975 | Schmidt .............................. 144/144 R |
| 3,942,566 | 3/1976 | Schmidt .............................. 144/144 R |
| 4,207,709 | 6/1980 | Betzler . |
| 4,249,446 | 2/1981 | Tallerico, Jr. .............................. 83/789 |
| 4,522,092 | 6/1985 | Dorosz . |
| 4,528,780 | 7/1985 | Halberschmidt . |
| 4,627,772 | 12/1986 | Petersen . |
| 4,880,042 | 11/1989 | Schafferkotter . |
| 5,135,393 | 8/1992 | Eidenbenz et al. . |
| 5,256,011 | 10/1993 | Taylor ....................................... 409/92 |
| 5,279,342 | 1/1994 | Drees . |
| 5,363,732 | 11/1994 | Heasley ................................. 83/471.2 |
| 5,421,228 | 6/1995 | Fukinuki ................................ 83/471.3 |
| 5,667,001 | 9/1997 | Sanger et al. . |
| 5,778,951 | 7/1998 | Huitsing ............................... 144/144.1 |

*Primary Examiner*—Kenneth E. Peterson
*Attorney, Agent, or Firm*—David P. Gordon; David S. Jacobson; Thomas A. Gallagher

[57] ABSTRACT

A coping device includes a circular blade, a template having an end provided with a coped profile, a stylus which traces the coped profile of the template and which preferably has substantially the same width and radius of curvature as the blade, clamps for respectively securing the molding and the template in a fixed position, and a base having a stationary portion and a movable portion movable in X and Y directions relative to the stationary portion. The clamps are coupled to the stationary portion, and the blade and the stylus are both coupled to the movable portion. The blade and the stylus are substantially simultaneously movable relative to the clamps so that the molding can be coped with the blade as the stylus traverses the coped profile of the template. The blade and the stylus have the same width, and the stylus is provided with a leading edge having a radiused contour matching the blade. In addition, when coping a crown molding, the blade and the stylus are tiltable to the same angle.

9 Claims, 9 Drawing Sheets

COPING APPARATUS

BACKGROUND OF THE INVENTION

1. Field of the Invention

This invention relates broadly to an apparatus for coping molding. More particularly, the present invention relates to a coping apparatus which accurately copes molding by using a stylus which follows a template and a cutting means which is directed to cope a piece of molding by movement of the stylus along the template.

2. State of the Art

Molding is often provided to the walls of a room to provide an attractive border to the room. Molding along the wall adjacent the floor is called baseboard molding. Molding along a central portion of the wall is called chair rail molding, often used to prevent the back of a chair from scraping and scarring the wall. The molding provided around a ceiling is referred to as crown molding and is often applied between the wall and ceiling at an angle such that the profile, or contoured pattern, of the face side of the molding is directed into the room. Coping is the process whereby the end of one piece of molding is shaped to seat flushly against the face of another piece to ensure that the two pieces of molding fit together properly (thereby having an attractive appearance) when joined at an inside corner.

In general, coping requires the laborious process of first forming a traced outline of a negative image of the profile of the molding, and then using a hand-held coping saw to cut about the end grain of the molding along the traced outline so that the end of the molding has the negative profile of the molding. With respect to crown molding, the coping process is further complicated by the respective angle relative to the wall and ceiling at which two pieces of corner molding are applied to the wall and ceiling. Because most walls do not intersect at exactly ninety degrees due to imperfections in the wall construction or warping of wood, it is desirable to 'undercut' the molding; that is, remove excess wood from the rear of the molding along the traced outline, to provide a back clearance. The undercut compensates for the likelihood that the wall corners are not true, and permits the coped piece of molding to meet the face of the other piece of corner molding so that the coped end can seat flush against the face side of the adjoining piece of molding without interference from the back of the molding.

The procedure of coping molding is an exacting process, requiring a high degree of care and the skills of an experienced carpenter. Moreover, the process is time consuming. As each corner requires a piece of molding to have a negative image of the profile of the molding cut into its end and checked for fit, and, quite often, modified one or more times, coping creates high demands on skilled labor resources.

U.S. Pat. No. 5,363,732 to Heasley discloses a coping apparatus which is designed to replace the hand cut method of coping and which purports to simplify and expedite the coping of molding. The device includes a circular saw blade having teeth set to one side driven by a motor and mounted on a movable mount, a pin-like stylus also coupled to the mount, a vertical clamp which holds a piece of molding by placing pressure on the face of the molding, and a support for holding a relatively flat template. A piece of molding is placed in the vertical clamp with the end to be coped facing the saw blade, and the stylus is moved about a template held in the support. The stylus is moved in one direction along the template and causes a corresponding movement of the saw blade through the wood. The saw blade may also be tilted, ostensibly to cut crown molding.

The Heasley device is beset by a number of serious drawbacks which prevent its operation as described. First, while the Heasley device requires the use of templates, the Heasley device does not enable the construction of a template. It will be appreciated that a template which simply has the profile of the molding will not correctly guide the saw blade, as the saw blade is round and will cut the molding at an offset related to the height of the molding. However, the height of the molding varies across its face. Only where the molding is relatively minimal in thickness, e.g., at its edges, will the Heasley device accurately reproduce the profile of the face of the molding on the coped end. Otherwise, the Heasley device provides no means of compensating for the offset, and as a result, the device will not produce the desired profile off a template. Second, the round saw blade of the Heasley device which cuts from one side is ill-equipped to cope left and right inside corners of the molding profile as can be done by a standard hand coping saw. Third, the clamp provided by Heasley to secure molding being coped will deform the face of the molding. Fourth, contrary to Heasley's description of his coping device, it has been found that the Heasley device is not able to cope crown moldings with the use of template.

SUMMARY OF THE INVENTION

It is therefore an object of the invention to provide a device that will quickly, simply, and accurately make a template and cope molding.

It is another object of the invention to provide a coping device that can cope crown molding.

It is a further object of the invention to provide a coping device that uses templates that are easy to create in the field and which permit the accurate reproduction of a negative image of the profile in the coped end.

It is also an object of the invention to provide a coping device having a saw blade that can approach and cut left and right inside corners in the end of a piece of molding.

It is an additional object of the invention to provide a coping device that guarantees proper alignment.

In accord with these objects, which will be discussed in detail below, a coping device for coping a piece of molding is provided. Generally the coping device includes a circular cutting means rotatable about an axis for cutting into an end of the piece of molding, a template having an end provided with a coped profile, a stylus which traces the coped profile of the template and which preferably has substantially the same width and radius of curvature as the cutting means, clamping means for respectively securing the molding and the template in a fixed position, and a base having a stationary portion and a movable portion movable in X and Y directions relative to the stationary portion. The clamping means are coupled to the stationary portion, and the cutting means and the stylus are both coupled to the movable portion. Thus, the cutting means and the stylus are substantially simultaneously movable relative to the clamping means so that the molding can be coped with the cutting means as the stylus traverses the coped profile of the template.

According to a preferred aspect of the invention, while the cutting means and the stylus are tiltable to the same angle when coping, they are each independently tiltable, preferably to any angle between 0° and 60° left and right. According to yet another preferred aspect of the invention, the template is a piece of molding manually cut on the device of the invention and then used as a template. It will be appreciated that the template may later be installed as any other piece of coped molding. Moreover, it is also preferable that the clamping means comprises two clamps, one for the template and one for the molding to be cut. The two clamps are adjustably referenced relative to the stylus and the cutting means, respectively, and provide both lateral and downward clamping forces on the lateral edges of the template and the molding to hold each securely. The clamping forces are directed against the molding such that neither the template nor the molding are visibly marred by the clamps.

According to one embodiment of the invention, the cutting means is a saw blade adapted to cut laterally from either side. The saw blade is preferably provided with a plurality of triple chip teeth and, in addition, preferably a plurality of strobe teeth permitting the saw blade to cut through the molding in one pass. According to an alternate embodiment, the cutting means is an abrasive disc able to 'cut' or abrade laterally.

In coping a piece of molding using the apparatus of the invention, the end of a piece of molding is cut at an angle, e.g., 45° off a perpendicular from a face of the molding, such that the angled end has an edge which outlines the profile of the molding. Preferably the edge is colored to form a dark outline of the profile. The molding is then clamped in the clamp situated in front of the cutting means. If the molding is a crown molding, the cutting means is oriented to the appropriate angle relative to the ceiling angle of the molding. Next, by eye, the cutting means is moved on the movable portion of the base in the X and Y directions such that the cutting means removes the edge of the molding within the dark outline to form a coped profile. This 'manually' cut piece of molding becomes the template for the coping device. The template is next moved to and secured within the clamp situated in front of the stylus, and another piece of molding is secured in the clamp in front of the cutting means. If the molding is a crown molding, the stylus is oriented to the angle of the cutting means. Then, with the cutting means operating, the stylus is guided to trace the coped profile consequently causing the cutting means to cut the end of the molding in front of the cutting means. Other pieces of molding may be similarly coped.

It will be appreciated that because the stylus preferably has the same radius as the cutting means and because both the stylus and cutting means can be tilted, the stylus can accurately track the profile of the template and direct the cutting means to accurately cope the end of the molding without imparting an undesirable offset to the profile of the molding. In addition, because the cutting means is round and will cope the molding along a radiused curve, it automatically provides a desirable undercut to the coped end of the molding provided the cutting is properly vertically aligned relative to the molding. Furthermore, because the clamps are referenced relative to the cutting means and the stylus, the profile imparted to the end of the coped molding will be accurately provided; i.e., aligned along the width, to the molding. Moreover, because the cutting means can laterally cut from two directions, it can be used to cope substantially any molding profile which is otherwise copeable by hand.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
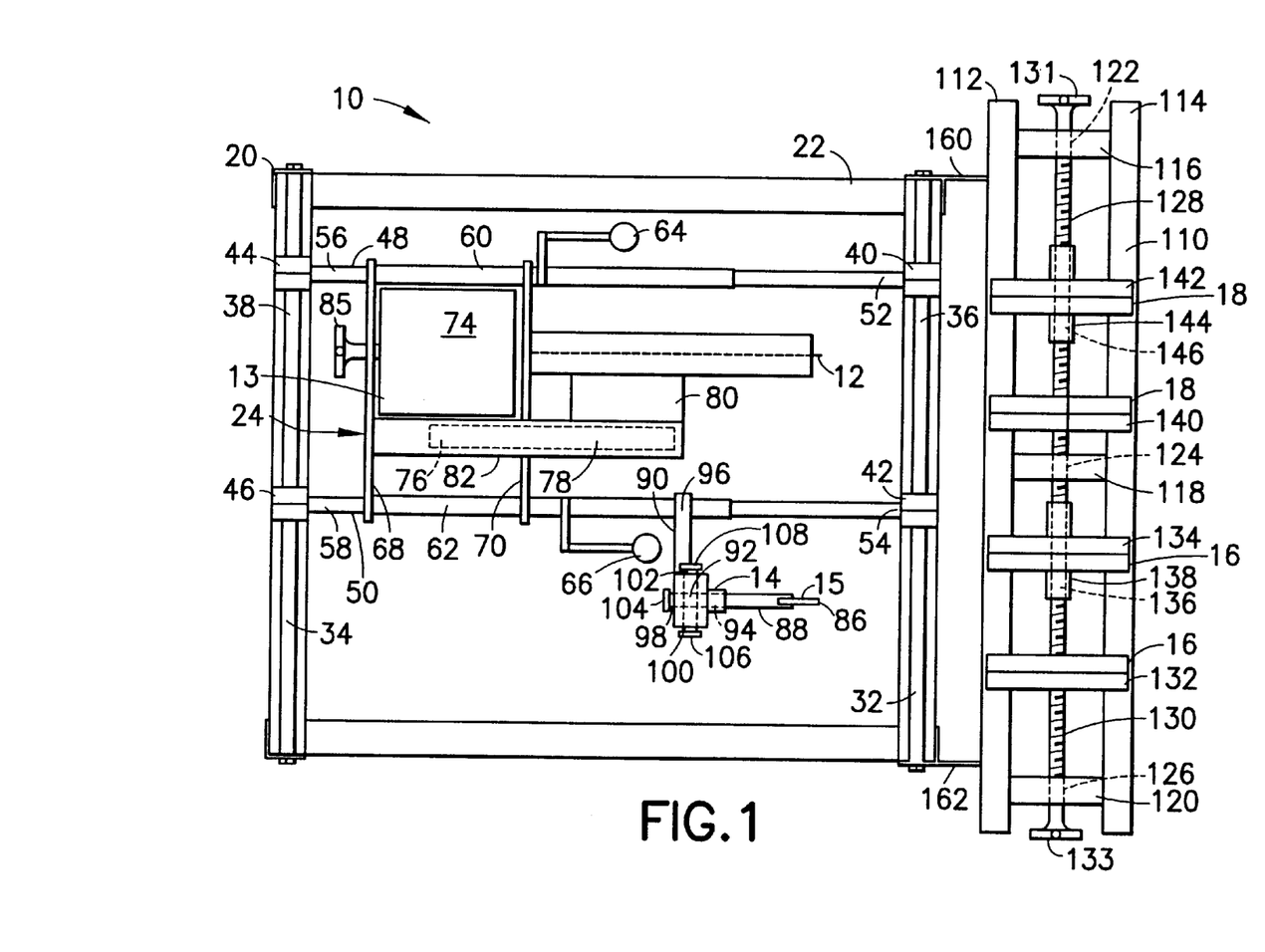
FIG. 1 is a top view of a coping device according to the invention.
Figure 2:
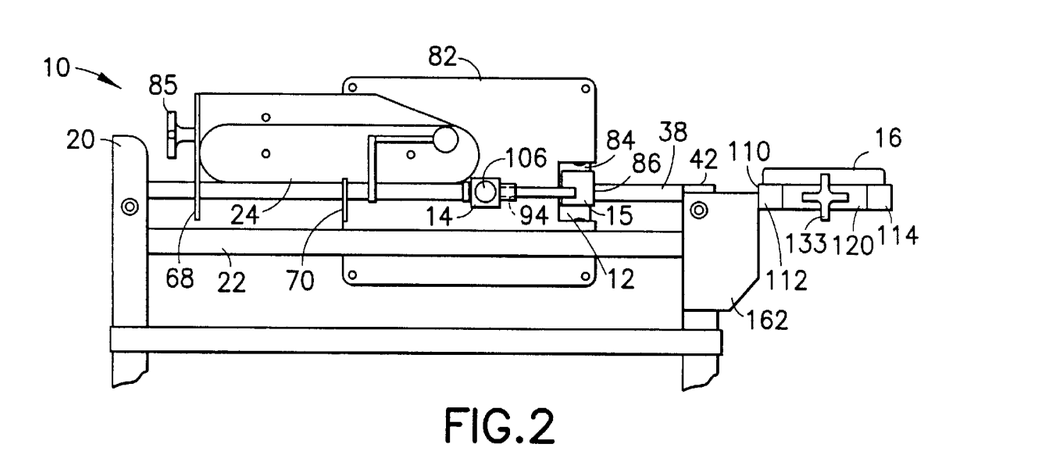
FIG. 2 is a broken side view of the coping device of FIG. 1.

Turning now to FIGS. 1 and 2, a coping device 10 for coping a piece of molding generally includes a circular cutting means 12, a power means 13 to drive the cutting means 12, a guiding means 14 including a stylus 15, a template clamp 16, a molding clamp 18, and a base 20 having a stationary portion 22 and a movable portion 24 movable in X and Y directions relative to the stationary portion. The clamps 16 and 18 are coupled to the stationary portion 22, as described in detail below. The cutting means 12 and the guiding means 14 are coupled to the movable portion 24 such that the cutting means and the guiding means are substantially simultaneously movable relative to the clamps 16, 18, as also described in detail below. A template having a coped profile, the construction of the template being described below, is secured in the template clamp 16, while a piece of molding to be coped is secured in the molding clamp 18. As will also be described in detail below, as the stylus 15 is traversed across the coped profile of the template, the cutting means 12 copes the piece of molding in the molding clamp.

More particularly, the stationary portion 22 of the base 20, which generally comprises a preferably rectangularly shaped frame, has front and rear low friction rods 32, 34. The movable portion 24 includes front and rear elongate bearing collars 36, 38 which slidably extend over the front and rear rods 32, 34, respectively. The front and rear elongate bearing collars 36, 38 have lateral coupling portions 40, 42, and 44, 46, respectively. The movable portion 24 also includes first and second low friction rods 48, 50 extending from the front rod 32 to the rear rod 34. The front end 52, 54 of the first and second rods 48, 50 are coupled in the coupling portions 40, 42 of the front elongate bearing collar 36, and the rear end 56, 58 of the first and second rods 48, 50 are coupled in coupling portions 44, 46 of the rear elongate bearing collar 38. As a result, the first and second rods 48, 50 may be laterally slidably moved over the front and rear low friction rods 32, 34 on the front and rear bearing collars 36, 38.

To facilitate movement in a second (front-back) direction, first and second elongate bearing collars 60, 62 are provided to slidably extend over the first and second rods 48, 50, respectively. Handle 64, 66 are provided to the first and second elongate bearing collars 60, 62. The first and second elongate bearing collars 60, 62 are rigidly coupled together by a rear cross plate 68 and a front cross bar 70. Providing force to the handles 64, 66 permits the first and second elongate bearing collars 60, 62 to be moved in the X and Y directions on the front and rear rods 32, 34 and first and second rods 48, 50.

Figure 3:
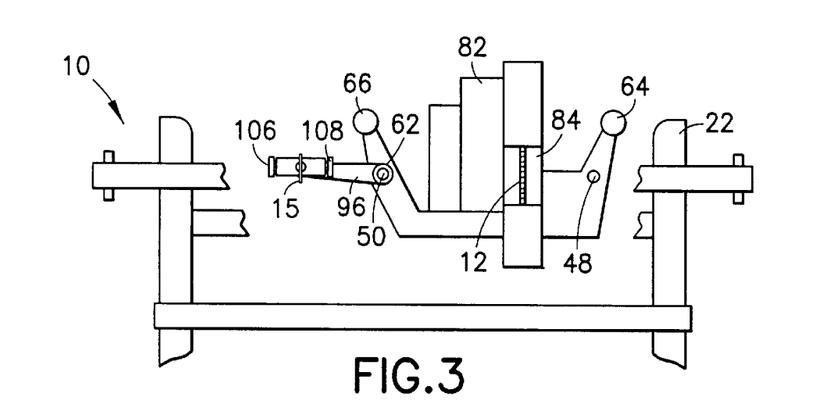
FIG. 3 is a broken partial front view of the coping device of FIG. 1.
Figure 4:
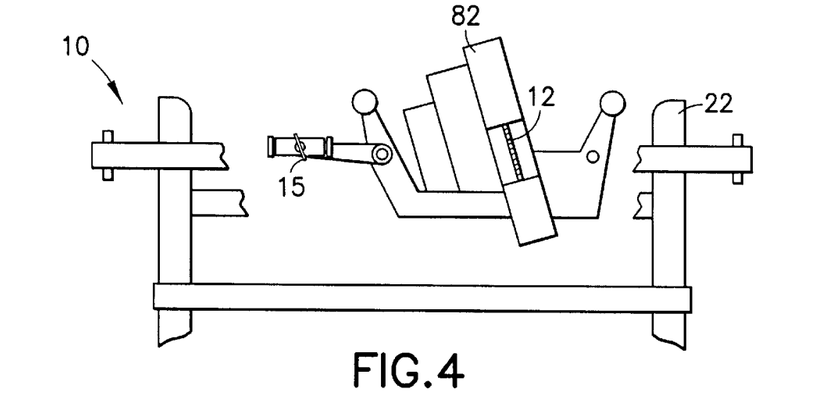
FIG. 4 is view similar to FIG. 3 with the cutting means and stylus tilted relative to vertical.

Referring to FIGS. 1, 2, and 3, the cutting means 12 and power means 13 are coupled to the rear cross plate 68, while the front cross bar 70 preferably extends under the cutting means 12 and power means 13. The power means 13 preferably includes a motor 74 which rotates a driver 76, a belt 78 rotated by the driver and which, in turn, rotates a drive shaft 80. The cutting means 12 is coupled to the drive shaft 80 such that when the drive shaft is rotated, the cutting means is rotated about its rotational axis. The motor 74, the driver 76, the belt 78, the drive shaft 80, and the cutting means 12 are preferably provided in or coupled to a protective housing 82. The housing 82 includes a window 84 through which the cutting means 12, which will be described further below, preferably extends. The housing 82 is pivotally coupled to the rear cross plate 68 by a lug (not shown) which extends from the housing 82 through a hole (not shown) in the cross plate 68. A locking knob 85 threadably engages the lug and can lock the housing in a particular pivotal orientation, preferably permitting the housing, and therefore the cutting means, to pivot (tilt) about a pivot axis (which divides the cutting means into two semicircular portions), preferably at any angle plus or minus 60° from the vertical. As seen in FIG. 4, the cutting means 12 and the housing 82 are shown pivoted approximately 30° about the pivot axis.

Figure 5:
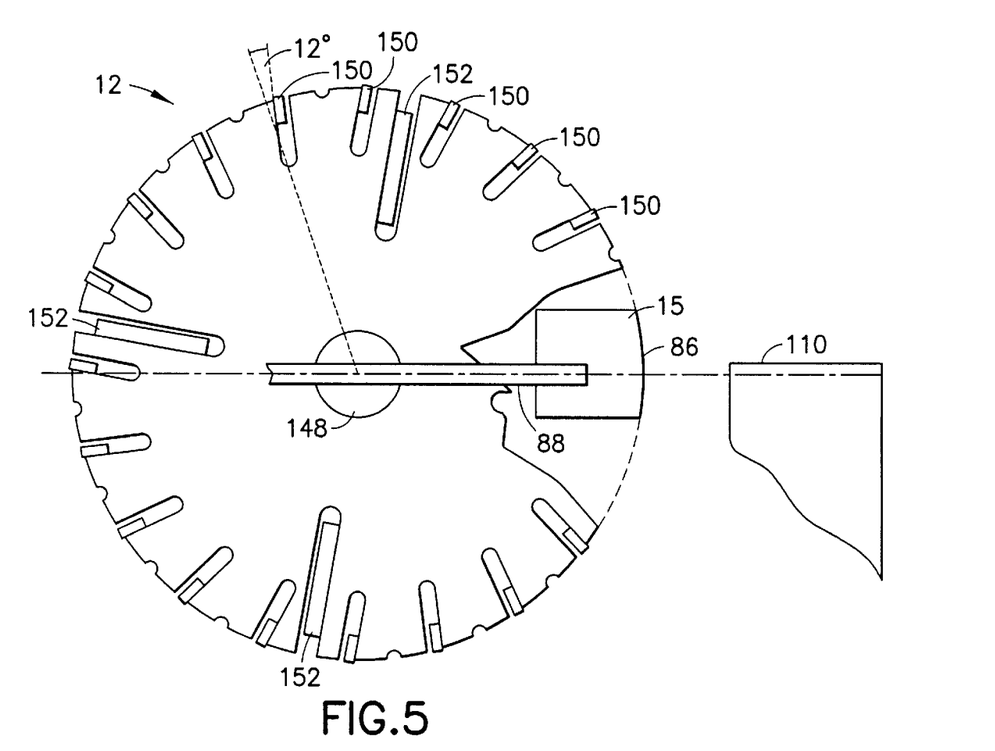
FIG. 5 is a broken side view of the stylus and preferred cutting means of the coping device of the invention.
Figure 6:
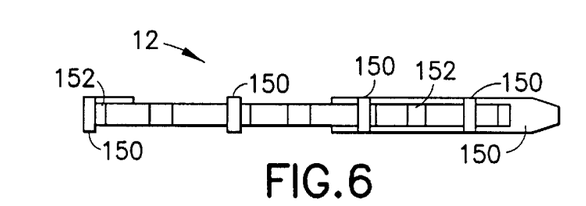
FIG. 6 is a broken top view of the cutting means shown in FIG. 5.

Turning now to FIGS. 5 and 6, and according to a first embodiment of the invention, the cutting means 12 is preferably an eight inch diameter saw blade having a central hole 148 through which the drive shaft 80 extends. The saw blade 12 has the ability to cut laterally from either side of the blade as it is provided with a plurality of triple chip teeth 150, preferably all oriented at a positive hook angle, e.g., 12°. In addition, preferably four elongate strobe teeth 152 are also equally spaced around the saw blade and overlap the cut of the triple chip teeth 150 to allow uninterrupted cutting of the molding. The strobe teeth 152 are preferably radially-oriented (i.e., no hook angle), but may alternatively be provided with negative or positive hook angles. The strobe teeth 152 extend on both sides of the saw blade.

Figure 7:
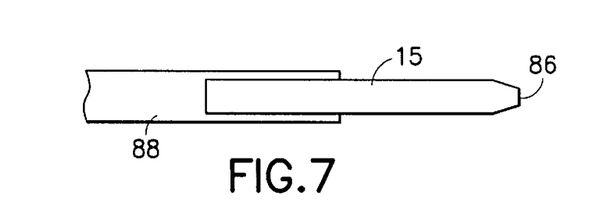
FIG. 7 is a broken top view of the stylus shown in FIG. 5.

Referring back to FIGS. 1 and 2, the guiding means 14 includes the stylus 15 which has a leading edge 86 that contacts a template, described below, and a shaft 88. The shaft 88 is coupled to a mount 90 which includes a block 92 having a bore 94 sized to receive the shaft 88, and a bracket 96 which is coupled directly to the second elongate bearing collar 62. The block 92 is further provided with preferably three threaded adjustment shafts 98, 100, 102, each rotated by a knob 104, 106, 108 to cause the respective shaft to enter or retract from the bore 94 and contact the shaft 88. Loosening of the individual adjustment shafts 98, 100, 102 permits fine adjustment of the shaft 88 left or right, front or back, or pivotally, and tightening of the adjustment shafts then locks the shaft 88 of the stylus 15 in position. As such, referring to FIG. 5, the leading edge 86 of the stylus 15 can be forwardly aligned with the cutting edge of the cutting means 12. In addition, referring to FIG. 4, the stylus 15 can be pivoted to the same degree as the cutting means 12. Moreover, referring to FIG. 5, it is clearly shown that the pivot axis of the stylus 15 is in the same horizontal plane as the pivot axis of the cutting means 12. More particularly, referring to FIGS. 5, 6 and 7, the leading edge 86 of the stylus 15 has the same radius of curvature as the cutting means 12, with the same thickness as the cutting means, and with the same profile as the cutting means, i.e., if the cutting means is a saw blade having triple chip teeth, the leading edge 86 of the stylus 15 has a triple chip profile.

Figure 8:
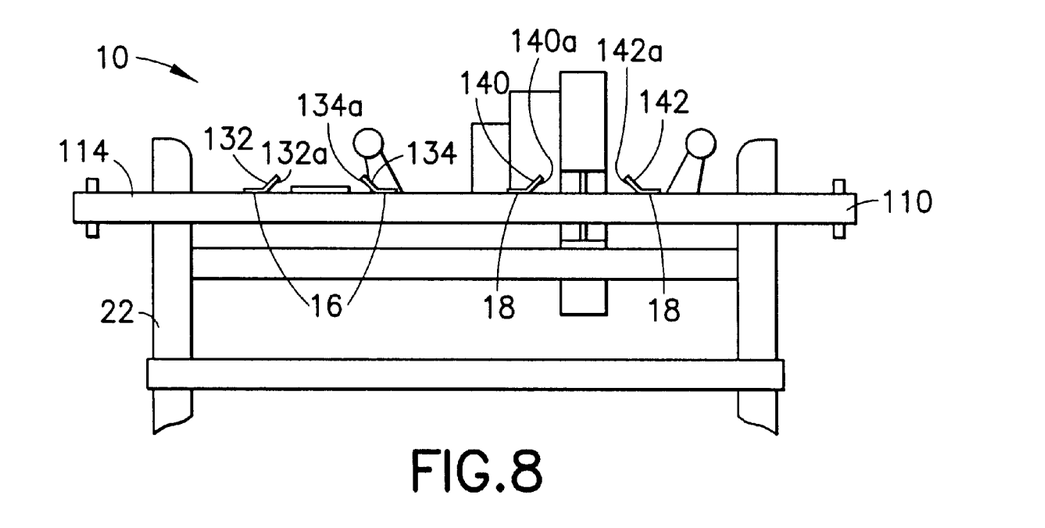
FIG. 8 is a broken front view of the coping device of FIG. 1.
Figure 9:
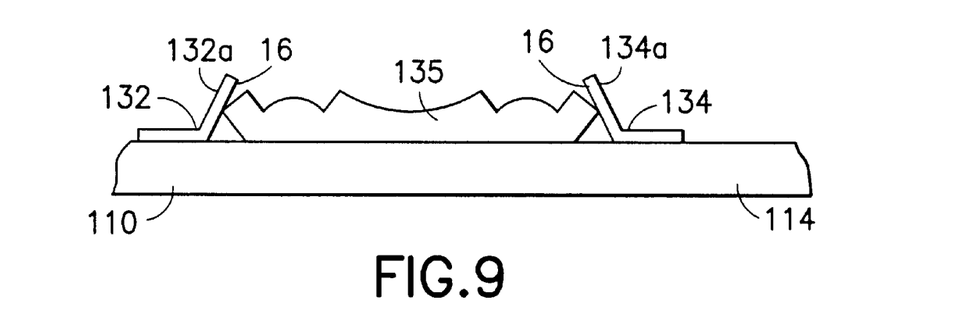
FIG. 9 is a broken front view of the template clamp with a template provided therein.

Referring again to FIGS. 1, and 2, the template clamp 16 and the molding clamp 18 are provided on a narrow table 110 formed by two laterally extending rails 112, 114 coupled by preferably three bars 116, 118, 120 extending between the rails. Each of the bars 116, 118, 120, is provided with a lateral throughbore 122, 124, 126. A first threaded rod 128 extends from one end of the table 110 to generally the midpoint of the table, passing through the lateral throughbore 122 in bar 116 and extending into lateral throughbore 124 in bar 118. A second threaded rod 130 extends from the other end of the table 110 to generally the midpoint of the table, passing through the lateral throughbore 126 in bar 120 and extending into lateral throughbore 124 in bar 118. Each threaded rod 128, 130 is provided with a manual rotation knob 131, 133 for rotating the respective rod. Turning now to FIGS. 1 and 8, the template clamp 16 includes a fixed first clamping portion 132 fixedly coupled, preferably by welding, across rails 112 and 114 of the table 110, and a movable second clamping portion 134 provided with a lower portion 136 having a threaded lateral throughbore 138. The second threaded rod 130 is thread through the lateral throughbore 136 of the second portion 134 such that rotation of the second threaded rod causes lateral movement of the second clamping portion 134. The first and second clamping portions 132, 134 include template gripping portions 132a, 134a which are inwardly angled toward each other. Referring to FIGS. 8 and 9, it will be appreciated that when a template 135 is placed in the template clamp 16 and the template clamp is tightened by rotation of the second threaded rod 130, the template gripping portions 132a, 134a move toward each other and place inward pressure against the molding 135. Moreover, the angle of the template gripping portions 132a, 134a causes the template gripping portions to hold the template securely against the table 110. Referring back to FIG. 8, the molding clamp 18, which is substantially similar to the template clamp 16, includes a fixed first clamping portion 140 fixedly coupled across rails 112 and 114, and a second clamping portion 142 provided with a lower portion 144 having a threaded lateral throughbore 146. The first threaded rod 128 is thread through the lateral throughbore 146 of the second clamping portion 142 such that rotation of the first threaded rod causes lateral movement of the second clamping portion 142. As with the template clamp 16, the first and second clamping portions 140, 142 of the molding clamp 18 include inwardly angled molding gripping portions 140a, 142a. The lateral distance between the fixed template gripping portion 132a and the fixed molding gripping portion 140a is substantially the same as the lateral distance between the cutting means 12 and the stylus 15. The table 110 is coupled to the front end of the stationary member 22 by brackets 160, 162 such that the plane of the table surface (i.e., the surface on which the template and molding to be coped are positioned and held when using the coping device of the invention, as described below), lies above the plane extending through the pivot axes of both the cutting means 12 and the stylus 15 (FIG. 5).

Figure 10:
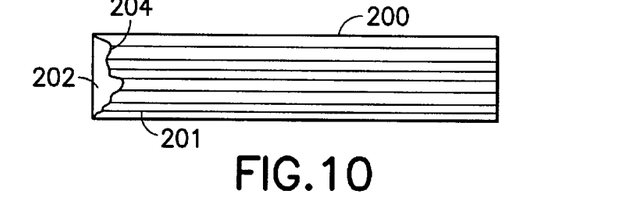
FIGS. 10, 11 and 12 illustrate the method of coping baseboard molding and chair rail molding according to the invention.
Figure 11:
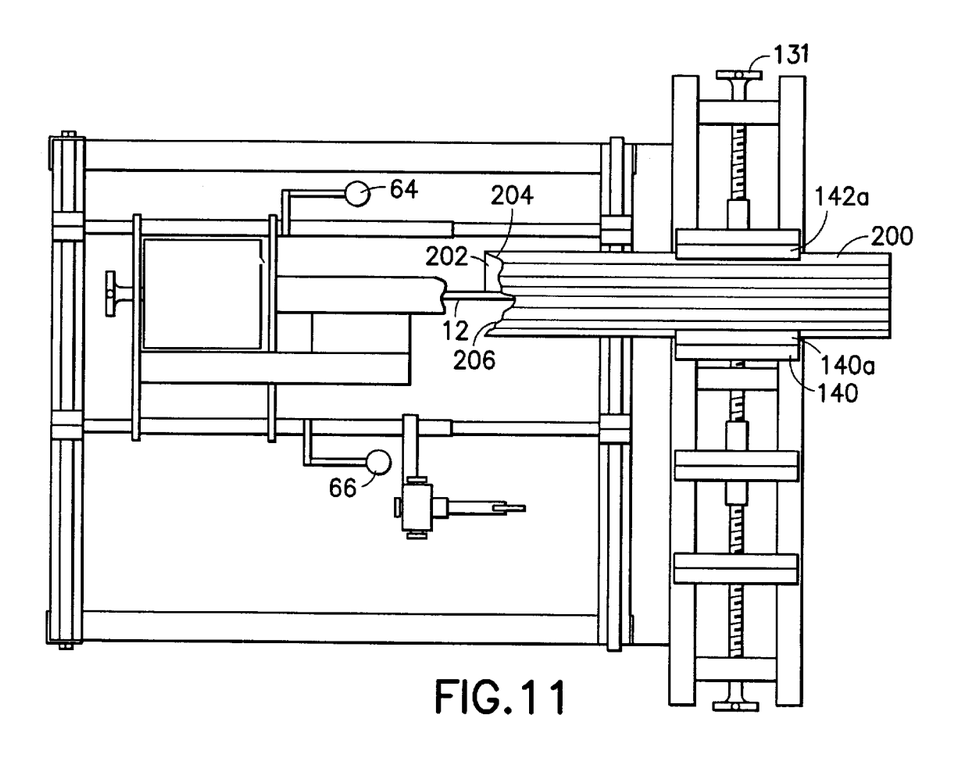

As will now be described with reference to FIGS. 10 through 12, the device of the invention can be used to cope baseboard, chair rail, and crown molding. Referring to FIG. 10, with respect baseboard and chair rail molding, first, an end 202 of a piece of molding 200 is cut with a conventional powered or hand saw at an angle, e.g., 45° off a perpendicular from a face 201 of the molding. This exposes the profile of the molding; i.e., the cut end 202 (shown in hatching) has an edge 204 which outlines the profile of the molding. Next, referring to FIG. 11, the molding clamp 16 is opened by rotating knob 131, and the molding 200 is situated on the table 110 between the first and second clamping portions 140, 142 such that the cut end 202 is oriented toward the cutting means 12. The clamp 16 is then closed about the molding. It will be appreciated that the angled molding gripping portions 140a, 142a of the molding clamp 16 apply inward and downward pressure on the molding to hold the molding secure without marring the face of the molding and allow good reference off table 110. Then, as shown in FIG. 11 (with the housing around the cutting means shown in broken lines to better view the cutting means), the cutting means 12 is powered to rotate about its rotational axis and, by eye, the cutting means 12 is maneuvered across the cut end 202 by gripping the handles 64, 66 and moving the movable portion 24 in X and Y directions. The triple chip teeth 150 and strobe teeth 152 (FIG. 5) laterally cut and remove the wood of the cut end 202 within the edge 204 such that the cut end 202 of the molding has a coped profile 206. It will be appreciated that the teeth cut forwardly and laterally from either side of the saw blade so that both left and right inside corners may be cut. The coped profile 206 is such that the molding will cleanly mate with another piece of molding having a face with the same profile as the coped molding at an inside 90° corner. In addition, as the molding 200 is cut with a round cutting means 12, and because the table 110 is provided on a higher horizontal plane than the round cutting means, the coped profile 206 will include a desirable undercut to the back of the molding. The molding cut by eye can now become the template 200 to cut additional pieces of molding, as hereinafter described.

Figure 12:
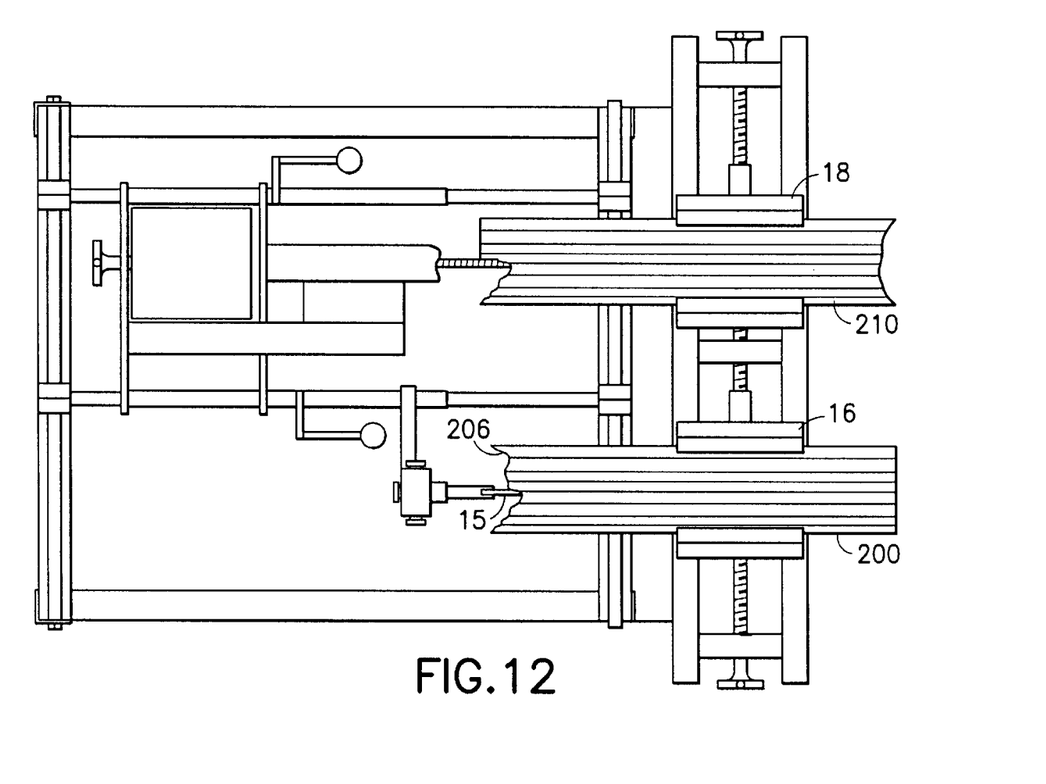

Turning to FIG. 12, the template 200 is moved to and secured within the template clamp 16 situated in front of the stylus 15 and another piece of molding to be coped 210 is secured in the molding clamp 18 in front of the cutting means 12. With the cutting means 12 powered, the stylus 15 is manually moved to trace the coped profile of template 200. It will now be appreciated that movement of the stylus 15 across the coped profile 206 of the template 200 will cause the cutting means 12 to provide the same coped profile to the end 212 of the molding 210 because: a) the template clamp 16 and the molding clamp 18 each include fixed clamping portions 132, 140, respectively, which are the same distance from each other as the stylus 15 is from the cutting means 12; b) the stylus 15 and cutting means 12 are each provided with an edge having the same radius of curvature, the same thickness, and the same profile; and c) the stylus 15 and cutting means 12 are aligned on the same horizontal plane and are positioned at the same distance from the table 110. It will again be appreciated that because the cutting means can cut wood from each of its two sides, the coping device can cope the end of any piece of molding which is copeable. Other pieces of molding may then be coped using the same template. It will be further appreciated that because the template 200 is a piece of molding, the template may afterward be installed in a room being provided with coped molding, just as any other piece of coped molding.

Figure 13:
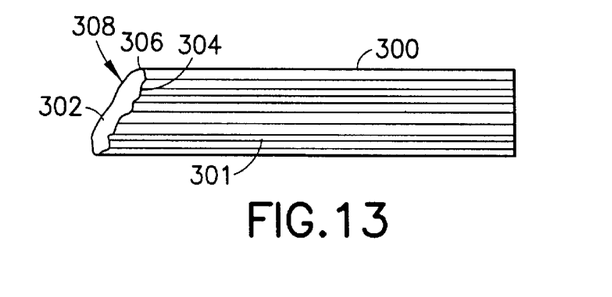
FIGS. 13, 14, and 15 illustrate the method of coping crown molding according to the invention.
Figure 14:
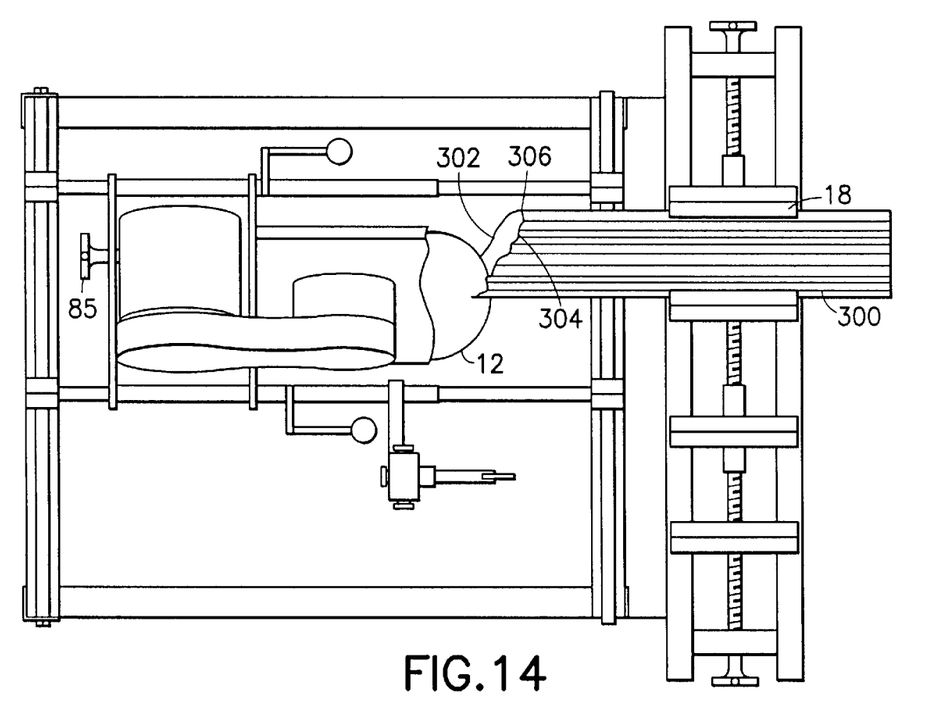

It will also be appreciated that the device of the invention can similarly be used to accurately cope crown molding. Turning now to FIG. 13, the template is made by first making an appropriate diagonal cut (typically at 45°) at the end 302 of a piece of crown molding 300, to provide a miter cut to the template. The diagonal cut, rather than being made perpendicular to the face of the molding, is also angled relative to the face 301 of the crown molding in order to expose the profile of the face of the molding, as described above with respect to baseboard and chair rail molding. The cut end 302 (shown in hatching) has an edge 304 which outlines the profile of the molding. Referring to FIG. 14, the molding 302 is then clamped in molding clamp 18. The locking knob 85 is loosened and the cutting means is moved against an angled side 306 angled relative to the back 308 (FIG. 13) of the molding 300 (i.e., the side of the crown molding which seats against a ceiling when installed), pivoted to the same angle as the angled side 306 (typically somewhere between 30° and 60° from the vertical), and locked in that pivotal orientation. It will be recognized that, depending on which piece of corner crown molding is being coped, the cutting means may be angled on either side of vertical. Then, as described above with reference to the baseboard and chair rail molding template, the cutting means is manipulated to forwardly and laterally cut the end 302 within the edge 304 such that the cut end 302 of the molding has the desired coped profile 306. The molding cut by eye can now be used as the template 300 to cut additional pieces of molding.

Figure 15:
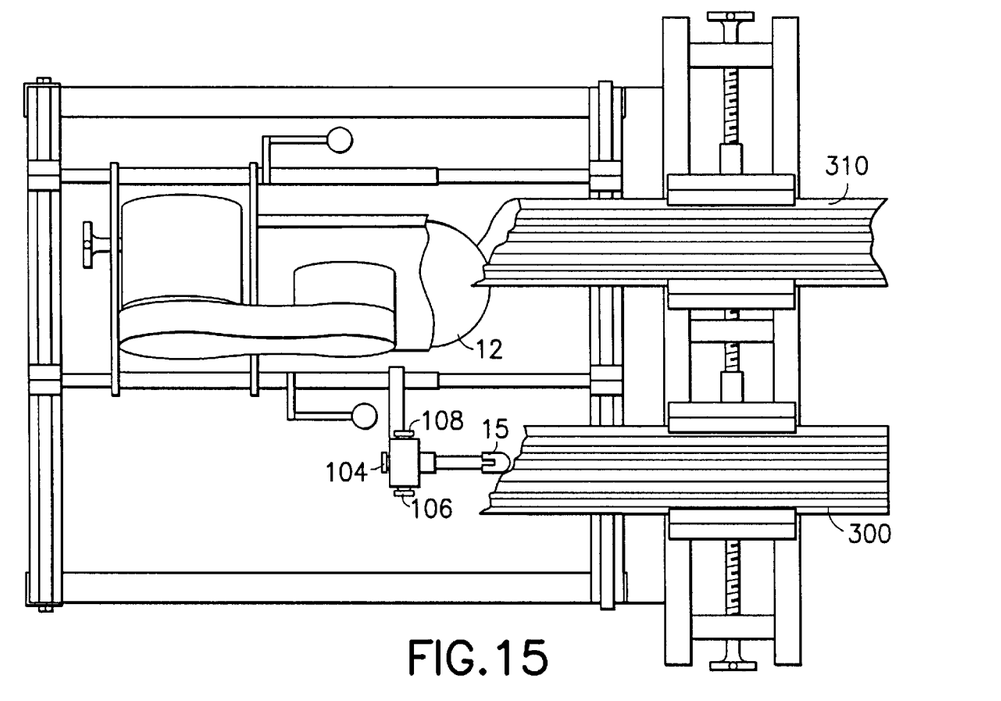

Turning now to FIG. 15, the template 300 is moved to and secured within the template clamp 16 and another piece of crown molding 310 is secured in the molding clamp 18. The adjustment knobs 104, 106, 108 of the mounting block of the guiding means are appropriately loosened to permit the stylus 15 to be pivoted to the angle of the angled side (i.e., the same angle at which the cutting means 12 is oriented), and locked into that pivotal orientation. As the stylus is manually moved to trace the coped profile of template, the powered cutting means will cope the molding 310. It will be further appreciated that because the stylus 15 can be pivotally oriented to the same angle as the cutting means, the coping device can accurately cope crown molding.

Figure 16:
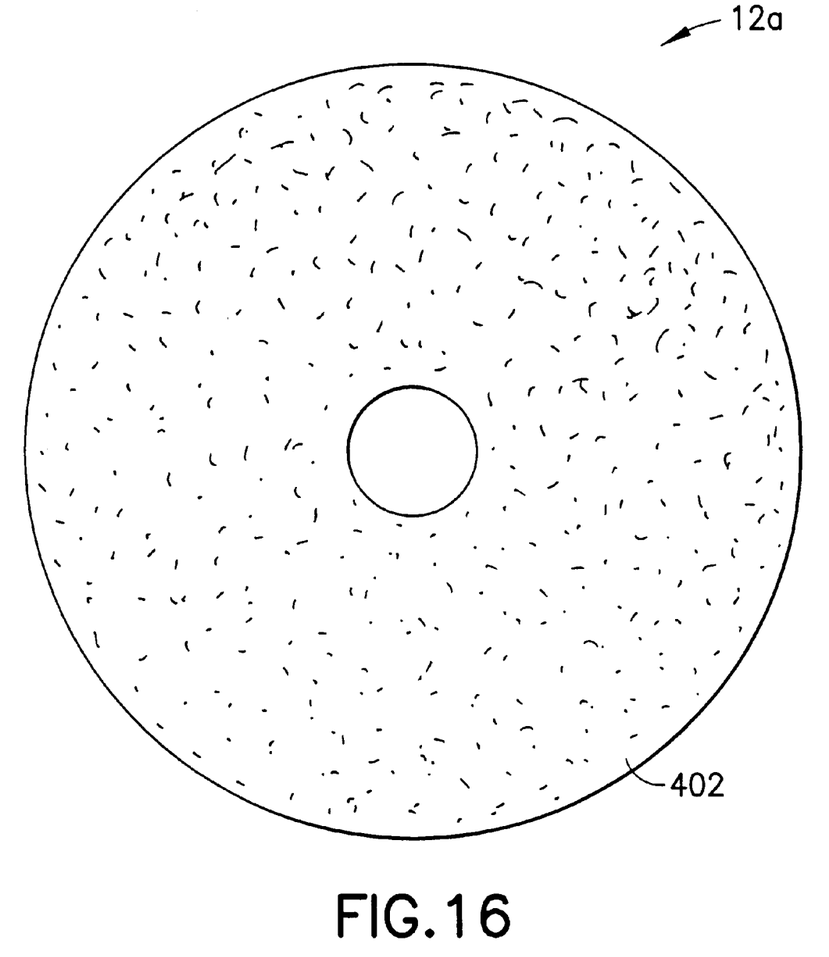
FIG. 16 is a side view of a second embodiment of the cutting means of the invention.
Figure 17:
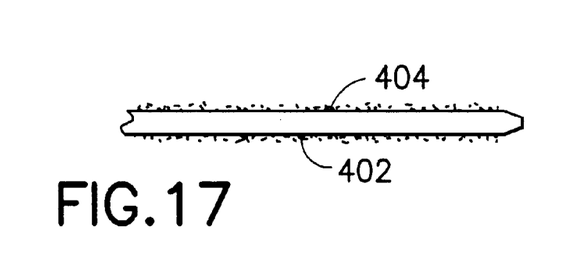
FIG. 17 is a broken top view of the cutting means shown in FIG. 16.

Turning now to FIGS. 16 and 17, a second embodiment of a cutting means 12a for use with the coping device of the invention is shown. The cutting means 12a is a disc having abrasive surfaces 402, 404 sufficient to abrade wood. As such the cutting means 12a can be used to laterally 'cut' wood during the coping process.

There have been described and illustrated embodiments of a coping device. While particular embodiments of the invention have been described, it is not intended that the invention be limited thereto, as it is intended that the invention be as broad in scope as the art will allow and that the specification be read likewise. Thus, while a motor has been described for rotating the cutting means, it will be appreciated that cutting means may be otherwise powered to rotate, e.g., pneumatic or manual rotation means may be employed. Furthermore while particular types of cutting means have been disclosed, it will be understood that other round cutting means, and other sizes of cutting means, e.g., a ten inch diameter saw blade, can also be used for laterally cutting wood can also be used. In addition, while clamps which apply vertical and lateral pressure are preferred for securely holding both the template and the molding to be coped, it will be appreciated that other holding means, particularly for holding the template, may be used. Also, while the device of the invention has been described as being able to cut chair rail, baseboard, and crown moldings, it will be appreciated that the device can be used to cope any copeable molding. Moreover, while it has been described that the device is used for coping moldings made of wood, it will be appreciated that the device can cope copeable molding made from synthetic materials, such as plastics and rigid foams. It will therefore be appreciated by those skilled in the art that yet other modifications could be made to the provided invention without deviating from its spirit and scope as so claimed.

What is claimed is:

1. A coping apparatus for coping a piece of molding according to a template having a coped profile, comprising:
    a) a circular cutting means for cutting into an end of the piece of molding, said cutting means having a first radius of curvature in a cutting plane, wherein said cutting means is pivotally positionable about a first pivot axis extending in said cutting plane such that said cutting plane of said cutting means is pivotally positionable about said first pivot axis;
    b) first clamping means for securely holding the piece of molding such that the end of the piece of molding is directed at the circular cutting means;
    c) holding means for holding the template;
    d) a stylus having a curvilinear contact portion having a second radius of curvature substantially the same as said first radius of curvature and extending in a second plane, and wherein said stylus is pivotally positionable about a second pivot axis parallel with said first Divot axis and extending in said second plane such that said curvilinear contact portion of said stylus is pivotally positionable about said second pivot axis;
    e) means for rotating said circular cutting means in a cutting action about an axis; and
    f) base means for positioning said cutting means relative to said piece of molding and said stylus relative to said template, said base means including a stationary portion and a movable portion movable relative to said stationary portion, one of said stationary portion and said movable portion being coupled to said first clamping means and said holding means and the other of said stationary portion and said movable portion being coupled to said cutting means and said stylus such that said cutting means and said stylus are substantially simultaneously movable relative to said first clamping means and the holding means, respectively, to cope the molding with the cutting means as said coped profile of the template is traversed by said stylus and contacted by said curvilinear contact portion,
    said base means also including a table portion defining a first horizontal plane, said first clamping means and said holding means being coupled to said table portion such that the piece of molding and the template are positioned on said first horizontal plane, and said first pivot axis and said second pivot axis extend in a second horizontal plane located coplanar with or below said first horizontal plane such that the piece of molding when coped by said coping apparatus is provided with an undercut.

2. A coping apparatus according to claim 1, wherein:
said cutting means has a first width and said stylus has a second width substantially the same as said first width.

3. A coping apparatus according to claim 1, wherein:
said first clamping means provides downward and inward clamping forces to secure the piece of molding, and said holding means is a second clamping means that provides downward and inward clamping forces to secure the template.

4. A coping apparatus according to claim 1, wherein:
said first clamping means includes a first fixed clamping portion, and said holding means is a second clamping means having a second fixed clamping portion provided a first distance from said first fixed clamping portion, and
said stylus and said cutting means are fixed at a second distance from each other which is substantially equal to said first distance.

5. A coping apparatus according to claim 1, wherein:
said cutting means and said stylus are each pivotable in a range of plus or minus sixty degrees from vertical.

6. A coping apparatus according to claim 1, further comprising: g) the template, wherein said template is made by the process of
    i) providing a piece of molding having an end, a back, and a face having a profile,
    ii) cutting said end at an angle relative to a perpendicular to said face to form an edge outlining said profile,
    iii) positioning said piece of molding in said first clamping means, and
    iv) moving said cutting means forwardly and laterally to cut said piece of molding to remove said end within said edge.

7. A coping apparatus according to claim 1, wherein:
said cutting means is a saw blade having first and second sides and a first plurality of teeth, a first portion of said first plurality of teeth able to cut on said first side of said saw blade and a second portion of said plurality of teeth able to cut on said second side of said saw blade.

8. A coping apparatus according to claim 7, wherein:
said saw blade includes a second plurality of strobe teeth, and
said first plurality of teeth are all triple chip teeth.

9. A coping apparatus according to claim 1, wherein:
said cutting means is a disc having first and second abrasive sides which can cut wood.

* * * * *